United States Patent
Fischer

(10) Patent No.: US 8,832,449 B2
(45) Date of Patent: Sep. 9, 2014

(54) SECURITY CONSIDERATIONS FOR THE LTE OF UMTS

(75) Inventor: Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 694 days.

(21) Appl. No.: 12/293,807

(22) PCT Filed: Mar. 21, 2007

(86) PCT No.: PCT/KR2007/001386
§ 371 (c)(1),
(2), (4) Date: Sep. 19, 2008

(87) PCT Pub. No.: WO2007/108651
PCT Pub. Date: Sep. 27, 2007

(65) Prior Publication Data
US 2010/0235634 A1 Sep. 16, 2010

Related U.S. Application Data

(60) Provisional application No. 60/785,148, filed on Mar. 22, 2006, provisional application No. 60/797,459, filed on May 3, 2006.

(51) Int. Cl.
*H04L 9/00* (2006.01)
(52) U.S. Cl.
USPC ........... 713/181; 713/166; 713/171; 713/169; 713/168; 455/558; 455/411; 455/422.1; 380/278; 380/277; 380/201; 380/270; 380/247; 380/258; 370/252; 370/338; 714/748
(58) Field of Classification Search
USPC ........................................ 713/181
See application file for complete search history.

(56) References Cited

U.S. PATENT DOCUMENTS

| | | | |
|---|---|---|---|
| 6,763,112 B1 * | 7/2004 | Haumont | 380/247 |
| 6,857,075 B2 * | 2/2005 | Patel | 713/171 |
| 7,224,800 B1 * | 5/2007 | Flykt et al. | 380/247 |
| 7,313,414 B2 | 12/2007 | van Rooyen | |
| 7,366,303 B2 * | 4/2008 | Flykt et al. | 380/247 |
| 7,512,783 B2 * | 3/2009 | Naghian et al. | 713/155 |
| 7,626,960 B2 | 12/2009 | Muller | |
| 7,627,122 B1 * | 12/2009 | Horn et al. | 380/270 |

(Continued)

FOREIGN PATENT DOCUMENTS

| CN | 1363195 | 8/2002 |
|---|---|---|
| CN | 1642066 | 7/2005 |

(Continued)

OTHER PUBLICATIONS

Boman et al., "UMTS security", 2002.*

(Continued)

*Primary Examiner* — Ondrej Vostal
(74) *Attorney, Agent, or Firm* — Lee, Hong, Degerman, Kang & Waimey

(57) ABSTRACT

A method for providing message protection includes generating a ciphered message based upon a first counter, a message, and a ciphering key. The method further includes generating an unciphered message authentication code (MAC) based upon the first counter, an integrity protection key, and either the message or the ciphered message, and transmitting security protected data, which includes the MAC and the ciphered message, over a transmission medium.

14 Claims, 7 Drawing Sheets

(56) References Cited

U.S. PATENT DOCUMENTS

| | | | |
|---|---|---|---|
| 7,664,265 B2 * | 2/2010 | Isokangas et al. | 380/247 |
| 7,908,484 B2 * | 3/2011 | Haukka et al. | 713/181 |
| 2002/0178358 A1 * | 11/2002 | Perkins et al. | 713/169 |
| 2003/0044011 A1 * | 3/2003 | Vialen et al. | 380/201 |
| 2003/0100291 A1 * | 5/2003 | Krishnarajah et al. | 455/410 |
| 2004/0029576 A1 * | 2/2004 | Flykt et al. | 455/422.1 |
| 2004/0146041 A1 | 7/2004 | Lee et al. | |
| 2004/0151133 A1 | 8/2004 | Yi et al. | |
| 2004/0151317 A1 * | 8/2004 | Hyyppa et al. | 380/277 |
| 2004/0162065 A1 * | 8/2004 | Chun et al. | 455/422.1 |
| 2004/0224698 A1 | 11/2004 | Yi et al. | |
| 2005/0070277 A1 | 3/2005 | Hu | |
| 2005/0075124 A1 | 4/2005 | Willenegger et al. | |
| 2005/0078676 A1 | 4/2005 | Bae et al. | |
| 2005/0101351 A1 * | 5/2005 | Lee et al. | 455/558 |
| 2005/0111393 A1 | 5/2005 | Jeong et al. | |
| 2005/0138528 A1 | 6/2005 | Ameigeiras et al. | |
| 2005/0147127 A1 | 7/2005 | Putcha et al. | |
| 2006/0030342 A1 | 2/2006 | Hwang et al. | |
| 2006/0058047 A1 | 3/2006 | Jeong et al. | |
| 2006/0079205 A1 * | 4/2006 | Semple et al. | 455/411 |
| 2006/0095959 A1 * | 5/2006 | Williams et al. | 726/8 |
| 2006/0098567 A1 | 5/2006 | Willenegger et al. | |
| 2006/0128427 A1 | 6/2006 | van Rooyen | |
| 2006/0140148 A1 | 6/2006 | Kwak et al. | |
| 2006/0159031 A1 * | 7/2006 | Vialen et al. | 370/252 |
| 2006/0166653 A1 * | 7/2006 | Xu et al. | 455/412.2 |
| 2006/0291660 A1 * | 12/2006 | Gehrmann et al. | 380/277 |
| 2007/0083470 A1 * | 4/2007 | Bonner et al. | 705/51 |
| 2007/0136132 A1 | 6/2007 | Weiser et al. | |
| 2007/0154015 A1 * | 7/2007 | Polakos et al. | 380/255 |
| 2007/0157022 A1 * | 7/2007 | Blom et al. | 713/166 |
| 2007/0206530 A1 | 9/2007 | Lee et al. | |
| 2007/0250712 A1 * | 10/2007 | Salgado et al. | 713/171 |
| 2008/0003988 A1 * | 1/2008 | Richardson | 455/414.3 |
| 2008/0031245 A1 | 2/2008 | Pekonen | |
| 2008/0123851 A1 * | 5/2008 | Guccione et al. | 380/270 |
| 2008/0254833 A1 * | 10/2008 | Keevill et al. | 455/558 |
| 2008/0273704 A1 * | 11/2008 | Norrman et al. | 380/278 |

FOREIGN PATENT DOCUMENTS

| | | |
|---|---|---|
| EP | 1210838 B1 * | 11/2004 |
| EP | 1478198 | 11/2004 |
| EP | 1622316 | 2/2006 |
| JP | 2002510917 | 4/2002 |
| JP | 2004-135346 | 4/2004 |
| JP | 2005-117655 | 4/2005 |
| JP | 2005-518704 | 6/2005 |
| JP | 2005-252506 | 9/2005 |
| JP | 2007-522758 | 8/2007 |
| KR | 10-2005-0031268 | 4/2005 |
| KR | 10-2005-0073237 | 7/2005 |
| KR | 10-2005-0081511 | 8/2005 |
| KR | 10-2006-0012210 | 2/2006 |
| RU | 2262811 | 10/2005 |
| RU | 2263400 | 10/2005 |
| RU | 2004126154 | 1/2006 |
| RU | 2004126160 | 1/2006 |
| TW | 586308 | 5/2004 |
| TW | M240065 | 8/2004 |
| TW | 200509721 | 3/2005 |
| TW | I236808 | 7/2005 |
| TW | 2007-26280 | 7/2007 |
| WO | 01/17296 | 3/2001 |
| WO | 02/076127 | 9/2002 |
| WO | 2004/017581 | 2/2004 |
| WO | 2004/025842 | 3/2004 |
| WO | 2004/038995 | 5/2004 |
| WO | 2004/100588 | 11/2004 |
| WO | 2005/006596 | 1/2005 |
| WO | 2005/022812 | 3/2005 |
| WO | 2005/067492 | 7/2005 |

OTHER PUBLICATIONS

Bannister, "UMTS: origins, architecture and the standard, by Pierre Lescuyer, Reviewed by Jeffrey Bannister", 2004.*
Nyberg, "Cryptographic Algorithms for UMTS", 2004.*
Shneyderman et al., "Mobile VPNs for Next Generation GPRS and UMTS Networks", 2000.*
Niemi et al., "Hypertext Transferr Protocol (HTTP) Digest Authentication Using Authentication and Key Agreement (AKA)", 2002.*
Lescuyer et al., "UMTS: origins, architecture and the standard", 2004, p. 178 fig 7.16.*
Lei et al., "Security Architecture and Mechanism of Third Generation Mobile Communication", 2002.*
Walker, "On the Security of 3GPP Networks", 2000.*
Niemi et al., "Hypertext Transfer Protocol (HTTP) Digest Authentication Using Authentication and Key Agreement (AKA)", RFC 3310, 2002.*
Blumenthal et al., "Wireless Network Security Architecture", 2002.*
Lebold et al., "Wireless Technology Study and the Use of Smart Sensors for Intelligent Control and Automation", 2005.*
LG Electronics, "MBMS dual receiver," R2-060582, 3GPP TSG RAN WG2 Meeting #51, Feb. 2006.
LG Electronics, "Dual Receiver for MBMS," R2-061303, 3GPP TSG RAN WG2#53, May 2006.
3rd Generation Partnership Project (3GPP), "Technical Specification Group Radio Access Network; Introduction of the Multimedia Broadcast Multicast Service (MBMS) in the Radio Access Network (RAN); Stage 2 (Release 6)", 3GPP TS 25.346 V 6.7.0, Dec. 2005.
NTT DOCOMO INC., "Inter-RAT state transitions between UTRAN and EUTRAN", Tdoc-R2-060093, 3GPP TSG RAN WG2 #50, Jan. 2006.
3rd Generation Partnership Project (3GPP), 3GPP TS 25.331 V 6.8.0, Dec. 2005.
3rd Generation Partnership Project (3GPP); "Technical Specification Group Radio Access Network; Physical Layer Aspects for Evolved Universal Terrestrial Radio Access (UTRA) (Release 7)", 3GPP TR 25.814, V7.1.0, Sep. 2006, XP050369147.
3rd Generation Partnership Project (3GPP); "Universal Mobile Telecommunications System (UMTS); Introduction of the Multimedia Broadcast/Multicast Service (MBMS) in the Radio Access Network (RAN); Stage 2 (3GPP TS 25.346 version 6.7.0 Release 6)", Dec. 2005, pp. 1-60, XP050368039.
3rd Generation Partnership Project (3GPP); "Technical Specification Group Radio Access Network; Improvement of the Multimedia Broadcast Multicast Service (MBMS) in UTRAN (Release 7)", 3GPP TR 25.905, V7.0.0, Dec. 2006, pp. 1-41, XP050369327.
Motorola: "UE RF Aspects of Standalone Carrier for E-MBMS", R4-060929, 3GPP TSG RAN WG4#40, Aug. 2006, XP050176030.
Korean Intellectual Property Office Application Serial No. 10-2006-0084886, Notice of Allowance dated May 16, 2013, 2 pages.
Korean Intellectual Property Office Application Serial Number 10-2007-0000767, Notice of Allowance dated Nov. 15, 2013, 2 pages.

* cited by examiner

SECURITY CONSIDERATIONS FOR THE LTE OF UMTS

This application is a national stage application of International Application No. PCT/KR2007/001386, filed on Mar. 21, 2007, which claims the benefit of earlier filing date and right of priority to U.S. provisional patent applications Ser. No. 60/785,148, filed Mar. 22, 2006, and Ser. No. 60/797,459, filed May 3, 2006, the contents of all of which are hereby incorporated by reference herein in their entirety.

DISCLOSURE OF INVENTION

Technical Solution

The present invention relates generally to wireless communication systems, and in particular to methods for providing message protection and communicating key values.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS).

The long term evolution (LTE) of UMTS is under discussion by the 3rd generation partnership project (3GPP) which standardized UMTS. The 3GPP LTE is a technology for enabling high-speed packet communications. Many schemes have been proposed for the LTE objective including those which aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement. Generally, one NodeB is deployed in one cell. A plurality of user equipment (UE) may be located in one cell.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and a core network (CN). The E-UTRAN may include one or more evolved NodeB (eNodeB) 20. The CN may include a node for registering user equipment (UE) 10, and one or more E-UTRAN access gateway (AG) 30 positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also be referred to as a mobile station (MS), a user terminal (UT), a subscriber station (SS) or a wireless device.

An eNodeB 20 provides end points of a user plane and a control plane to the UE 10. AG 30 provides an end point of a session and mobility management function for UE 10. The eNodeB and AG may be connected via an S1 interface.

The eNodeB is generally a fixed station that communicates with a UE, and may also be referred to as a base station (BS) or an access point. One eNodeB may be deployed per cell. An interface for transmitting user traffic or control traffic may be used between eNodeBs.

AG 30 is also referred to as a mobility management entity/user plane entity (MME/UPE). The AG may be divided into a portion for performing a user traffic process and a portion for performing a control traffic process. New communication may be performed between the AG for performing the user traffic process, and an AG for performing the control traffic process using a new interface.

An interface for distinguishing between the E-UTRAN and the CN may be used. A plurality of nodes may be connected between eNodeB 20 and AG 30 via the S1 interface. The eNodeBs may be connected to each other via an X2 interface and neighboring eNodeBs may have a meshed network structure that has the X2 interface.

FIG. 2 is a block diagram depicting architecture of a typical E-UTRAN. In this figure, eNB 20 may perform functions of selection for Access gateway (AG) 30, routing toward the AG during a Radio Resource Control (RRC) activation, scheduling and transmitting of paging messages, scheduling and transmitting of Broadcast Channel (BCCH) information, dynamic allocation of resources to UEs in both uplink and downlink, configuration and provisioning of eNB measurements, radio bearer control, radio admission control (RAC), and connection mobility control in LTE_ACTIVE state.

In the E-UTRAN, AG 30 may perform functions of paging origination, LTE-IDLE state management, ciphering of the user plane, supporting a Packet Data Convergence Protocol (PDCP) function, System Architecture Evolution (SAE) bearer control, and ciphering and integrity protection of Non-Access Stratum (NAS) signaling.

FIGS. 3 and 4 are block diagrams depicting the user-plane protocol and the control-plane protocol stack for the E-UTRAN. In these figures, the protocol layers may be divided into a first layer (L1), a second layer (L2) and a third layer (L3) based upon the three lower layers of an open system interconnection (OSI) standard model that is well-known in the art of communication systems.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIGS. 3 and 4 is depicted in dashed lines because if the RLC functions are implemented in and performed by the MAC layer, the RLC layer itself is not required. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

In FIG. 3, the RLC and MAC layers (terminated in an eNB on the network side) may perform functions such as Scheduling, Automatic Repeat Request (ARQ), and Hybrid Automatic Repeat Request (HARQ). The PDCP layer (terminated in an AG on the network side) may perform for the user plane functions such as a header compression, an integrity protection, and ciphering.

In FIG. 4, the RLC and MAC layers (terminated in an eNB on the network side) perform the same functions as for the user plane. In this figure, the RRC layer (terminated in an eNB on the network side) may perform functions such as broadcasting, paging, RRC connection management, Radio Bearer (RB) control, mobility functions, and UE measurement reporting and controlling. The PDCP layer (terminated in an aGW on the network side) may perform functions for the control plane such as an integrity protection and ciphering. The NAS (terminated in an aGW on the network side) may perform functions such as a SAE bearer management, an authentication, an idle mode mobility handling, a paging origination in LTE_IDLE, and a security control for the signalling between aGW and UE, and for the user plane.

The NAS may be divided into three different states. First, a LTE_DETACHED state if there is no RRC entity in the NAS; second, a LTE_IDLE state if there is no RRC connection while storing minimal UE information; and third, a LTE_ACTIVE state if the RRC connection is established. Also, the RRC may be divided into two different states such as a RRC_IDLE and a RRC_CONNECTED. In RRC_IDLE state, the UE may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNB. In RRC_CONNECTED state, the UE has an E-UTRAN RRC connection and a context in the E-UTRAN, such that transmitting and/or receiving data to/from the network (eNB) becomes possible. Also, the UE can report channel quality information and feedback information to the eNB. In RRC_CONNECTED state, the E-UTRAN knows the cell which the UE belongs to, such that the network can transmit and/or receive data to/from UE, the network can control mobility (handover) of the UE, and the network can perform cell measurements for a neighboring cell.

In RRC_IDLE mode, the UE specifies the paging DRX (Discontinuous Reception) cycle. Namely, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area to another tracking area, the UE will send a tracking area update message to the network to update its location.

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for providing message protection includes generating a ciphered message based upon a first counter, a message, and a ciphering key. The method further includes generating an unciphered message authentication code (MAC) based upon the first counter, an integrity protection key, and either the message or the ciphered message, and transmitting security protected data, which includes the MAC and the ciphered message, over a transmission medium.

In an aspect, the method further includes transmitting the first counter over the transmission medium.

In another aspect, the security protected data further includes the first counter.

In an aspect, the transmission medium is unsecured.

In yet another aspect, the method further includes generating the ciphered message using a ciphering algorithm.

In still yet another aspect, the method further includes generating the unciphered MAC using an integrity protection algorithm.

In one aspect, the method further includes incrementing the first counter at each transmission of the security protected data, such that a receiving entity synchronizes a second counter based upon a detection of the transmission of the security protected data.

In accordance with an alternative embodiment, a transmitter operable in a communication network includes a processor and a receiver. The processor may be configured to provide message protection operations such that it can generate a ciphered message based upon a first counter, a message, and a ciphering key, as well as generate an unciphered message authentication code (MAC) based upon the first counter, an integrity protection key, and either the message or the ciphered message. The transmitter is configured to transmit security protected data, which includes the MAC and the ciphered message, over a transmission medium.

In accordance with another alternative embodiment, a method for communicating key values in a communication system includes receiving an authentication request having first authentication parameters and at least one key value, such that the at least one key value is integrity protected and ciphered. The method further includes transferring the first authentication parameters to an authentication unit, and receiving from the authentication unit a first integrity key, a first ciphering key, and a second authentication parameter which were are all generated based upon the first authentication parameters. Another operation includes deciphering the at least one key value based upon the first integrity key and the first ciphering key.

In accordance with yet another alternative embodiment, a method for communicating key values in a communication system includes transmitting an authentication request having first authentication parameters and at least one key value, such that the at least one key value is integrity protected and ciphered. The method may also include receiving an authentication response having a second authentication parameter generated based upon the first authentication parameters.

These and other embodiments will also become readily apparent to those skilled in the art from the following detailed description of the embodiments having reference to the attached figures, the invention not being limited to any particular embodiment disclosed.

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

Reference will now be made in detail to the preferred embodiments of the present invention, examples of which are illustrated in the accompanying drawings. Wherever possible, the same reference numbers will be used throughout the drawings to refer to the same or similar parts.

Figure 5:
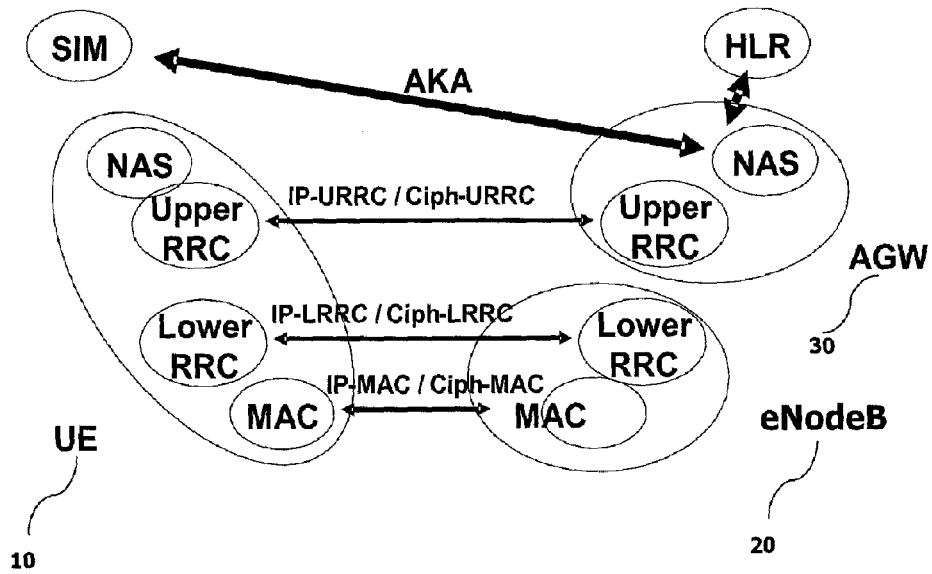
FIG. 5 depicts various entities of the control plane that may be related to security.

FIG. 5 depicts various entities (e.g., UE 10, eNodeB 20, and AG 30), of the control plane that may be related to security. For instance, non-access stratum (NAS) signaling, with regard to both ciphering and integrity protection, is typically implemented and terminated above eNodeB 20. The termination point is typically in AG 30 or above, and activation/deactivation is usually not controlled by the eNodeB. In the illustrated example, the NAS and upper RRC are handled as the same layer and are referred to as the URRC.

For the user plane, ciphering may be accomplished in the access gateway, or more specifically, in the user plane entity (UPE). Ciphering in the UPE potentially adds another security concern. It is not an essential feature to provide ciphering for RRC signaling that is terminated in the eNodeB (lower RRC), or to provide ciphering and integrity protection for MAC signaling terminated in the eNodeB.

It is often desirable to protect the NAS and URRC messages, for example, which are generated in UE 10 and AG 30. Ciphering and integrity protection of these messages may be accomplished using known techniques.

Figure 1:
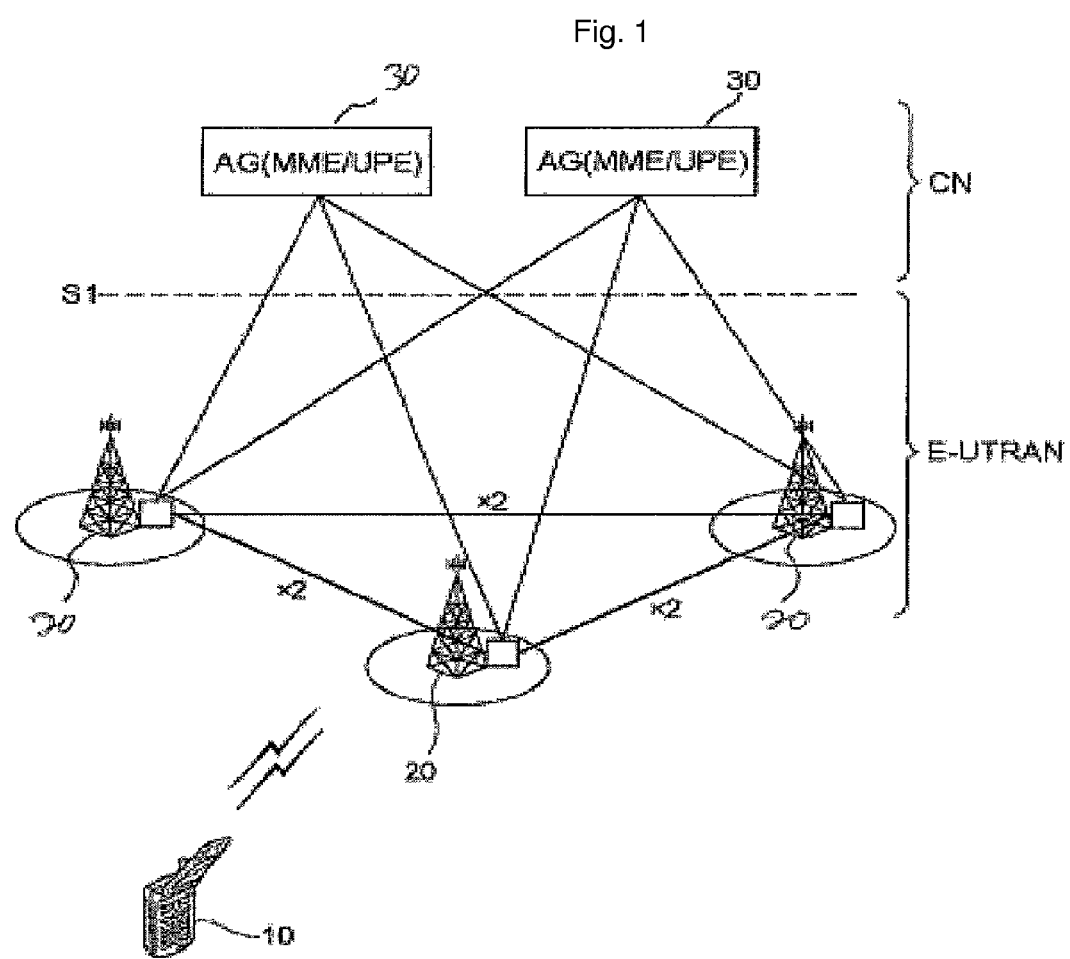
FIG. 1 is a block diagram illustrating a communication network, such as an evolved universal mobile telecommunication system (E-UMTS)
Figure 2:
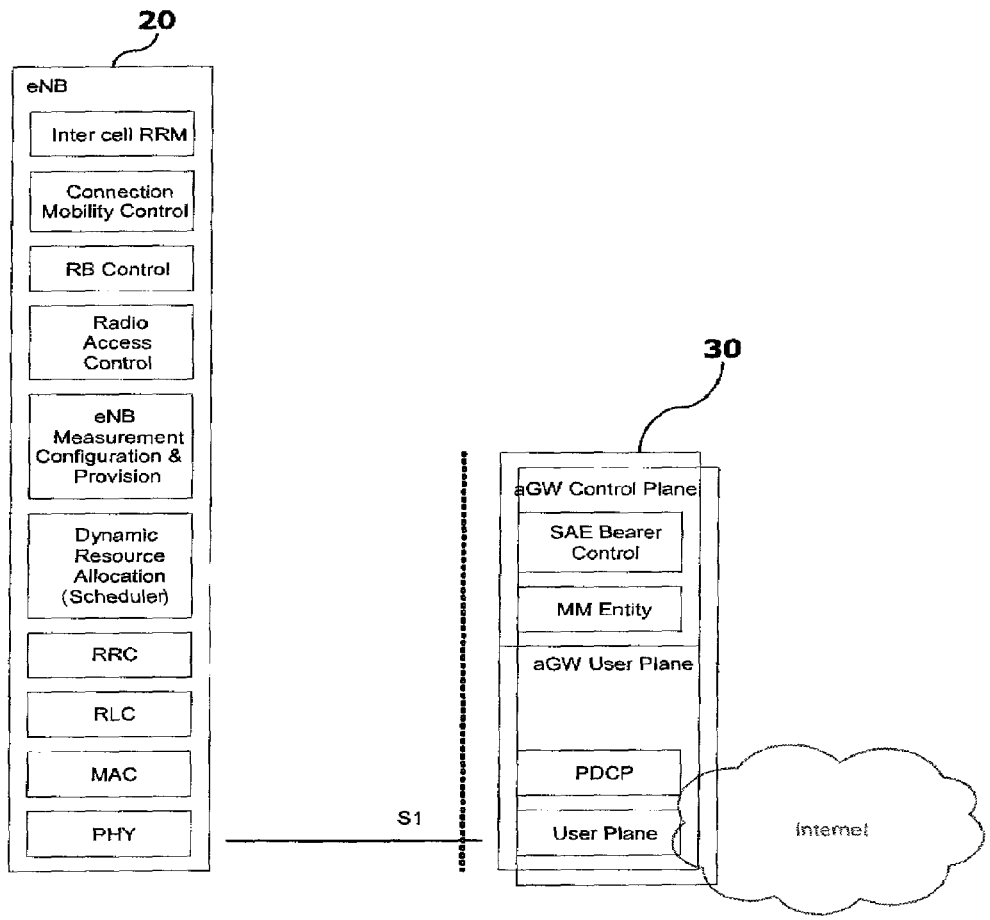
FIG. 2 is a block diagram depicting architecture of a typical E-UTRAN.
Figure 3:
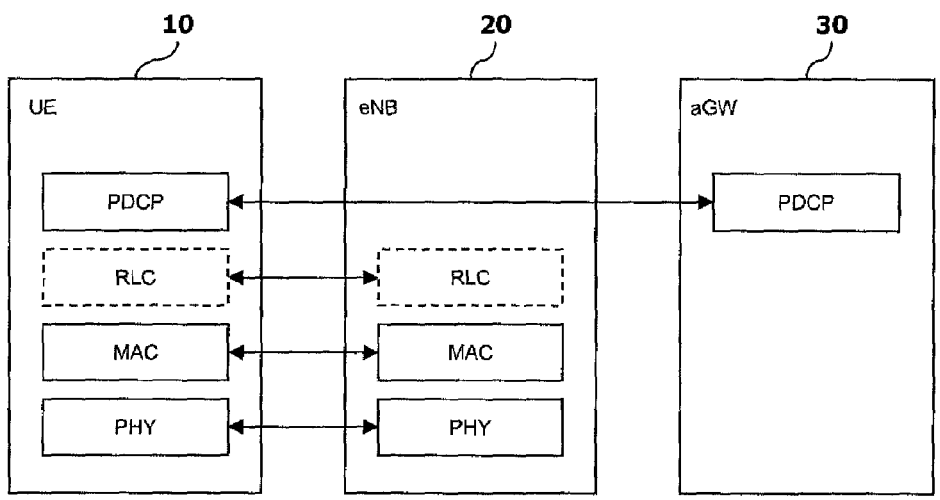
FIG. 3 is a block diagram depicting the user-plane protocol stack for the E-UTRAN.
Figure 4:
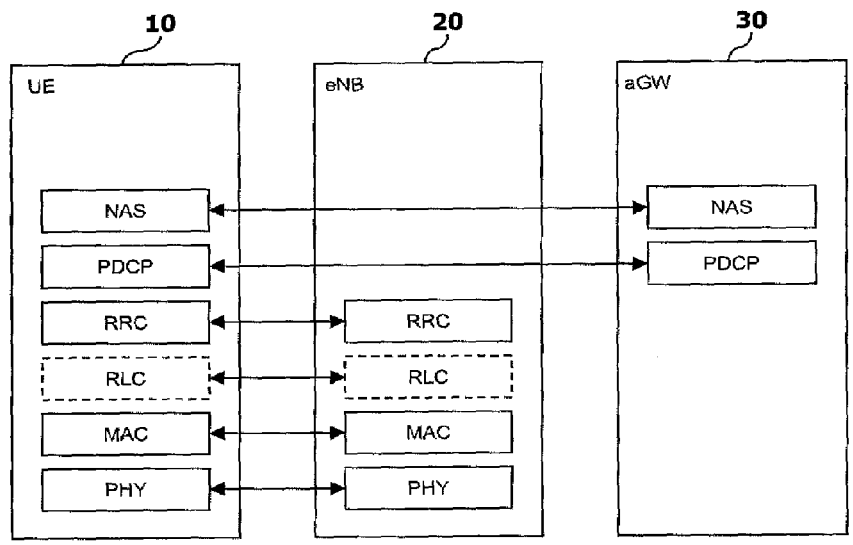
FIG. 4 is a block diagram depicting the control-plane protocol stack for the E-UTRAN.

In a conventional network, automatic repeat request (ARQ) sequence numbers (SNs) are typically included in the eNodeB, and ciphering is often performed in the AG. However, in accordance an embodiment, a sequence number may be introduced in the AG and/or UE. This sequence number may represent the last bits of a COUNT-C/I value, for example, which may be used as an input parameter to an algorithm that builds the message authentication code (MAC) (which is of course different than the MAC layer discussed with regard to FIG. 1), and as input to the ciphering algorithm.

Separate COUNT-C and COUNT-I values are not required. Consequently, at key change, algorithm change, or ciphering/integrity start or stop, a single activation time may be used instead of using separate activation times for ciphering and integrity. That is, the AG and the UE may indicate the sequence number for which the transmitting entity will use to initiate the new key or algorithm, and when the receiving entity needs to switch to the new key or algorithm.

Figure 6:
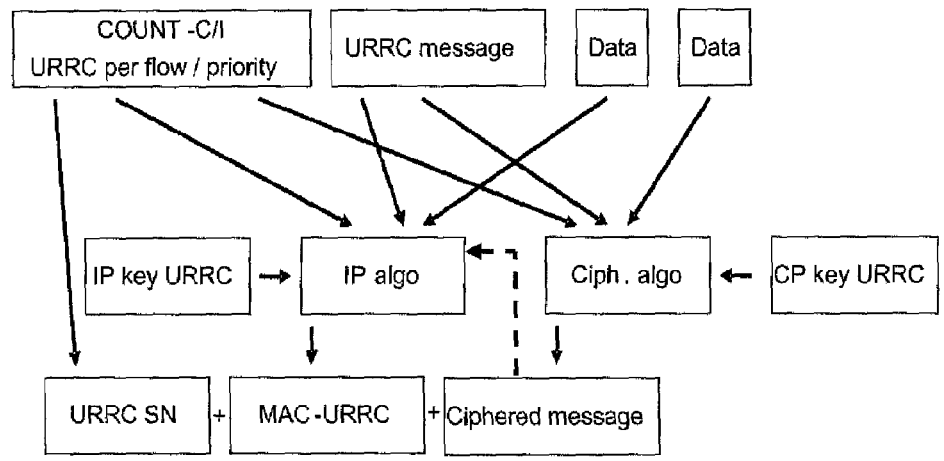
FIG. 6 is a block diagram depicting a method for transmitting security protected data, such as a MAC and ciphered message, over a transmission medium.

FIG. 6 is a block diagram depicting a method for transmitting security protected data, such as a MAC and ciphered message, over a transmission medium. In particular, FIG. 6 shows the ciphering algorithm receiving various parameters including COUNT-C and/or COUNT-I values, the input message, the ciphering key, and optionally other input data. Examples of the optional input data include the radio bearer/flow identification, and the direction of the communication (i.e., uplink or downlink), among others. The input message may be a URRC message, and may further include other NAS messages.

The integrity protection (IP) algorithm is also shown receiving assorted parameters including COUNT-C and/or COUNT-I values, the input message, the IP key, and optionally other input data. In a typical embodiment, the integrity protection and ciphering of the input message are performed in parallel, but this is not a requirement.

The ciphering algorithm may be configured to generate a ciphered message based upon the counter value (or values), input message, and ciphering key. Likewise, the IP algorithm may be configured to generate an unciphered message authentication code (MAC) based upon the counter value (or values), an integrity protection key, and either the input message or a ciphered input message. Next, security protected data comprising the MAC and the ciphered message may be transmitted over a transmission medium.

The IP key and the ciphering key are shown as separate keys, but this is not a requirement and a single key may be used for both integrity protection and ciphering, if so desired. Another alternative is to additionally perform ciphering of the MAC.

Various aspects of the embodiment of FIG. 6 relate to the protection of URRC messages. However, protection of user plane messages and lower RRC (LRRC) messages may be accomplished in a manner similar to that shown in FIG. 6. Moreover, with regard to the lower RRC layer, since both ARQ and the LRRC are handled in the eNodeB, the UE and the eNodeB may perform ciphering in the ARQ layer instead of in the lower RRC layer.

Figure 7:
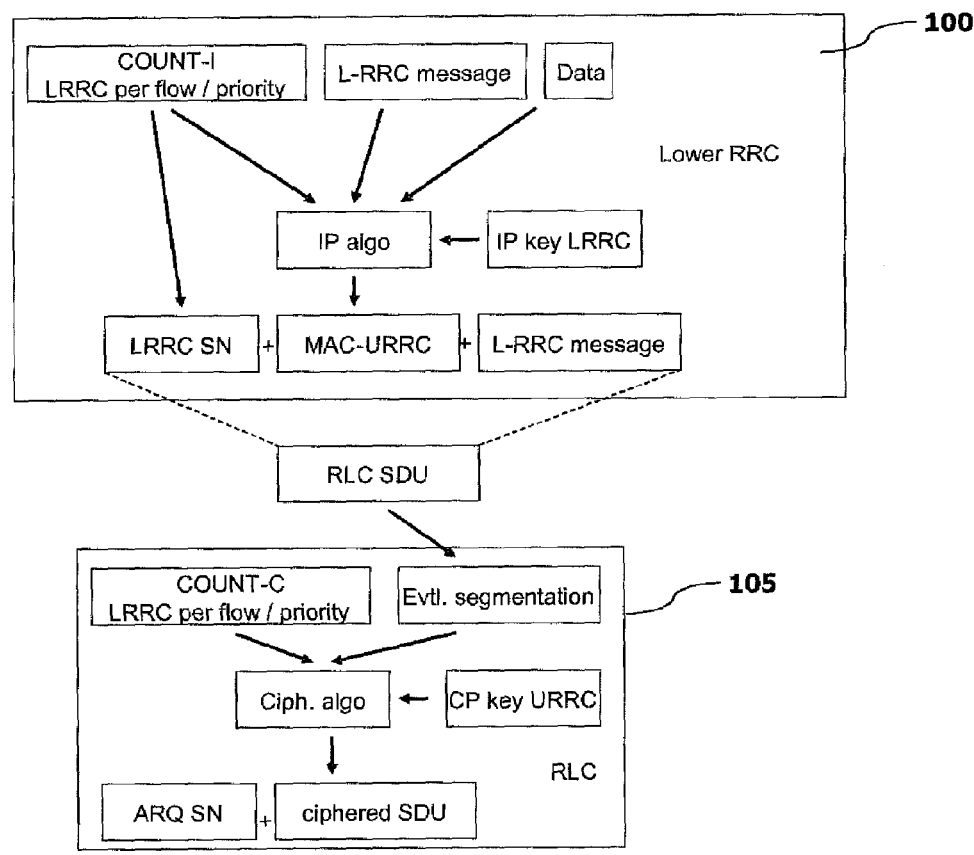
FIG. 7 is a block diagram which depicts a method for independently providing integrity protection and ciphering.

FIG. 7 is a block diagram which depicts a method for independently providing integrity protection and ciphering. In particular, the figure shows integrity protection being provided at lower RRC 100, and ciphering occurring at radio link control (RLC) layer 105.

Referring first to integrity protection, the IP algorithm is shown receiving assorted parameters including COUNT-I values, the input message, the IP key, and optionally other input data. The IP algorithm may be configured to generate an unciphered MAC based upon the counter value (e.g., sequence number), integrity protection key, and the input message. Next, integrity protected data, such as, for example, a service data unit (SDU). The SDU may include the MAC, the input (un-ciphered) message, and counter.

At RLC 105, the SDU, COUNT-C value, and the ciphering key is input to the ciphering algorithm. The ciphering algorithm may be configured to generate a ciphered message (e.g., ciphered SDU) based upon this input. These operations result in the generation of security protected data which includes the ciphered SDU.

Note that since integrity protection and ciphering occur independently, this process typically requires more sequence numbers than what is required in the embodiments of FIG. 6.

Figure 8:
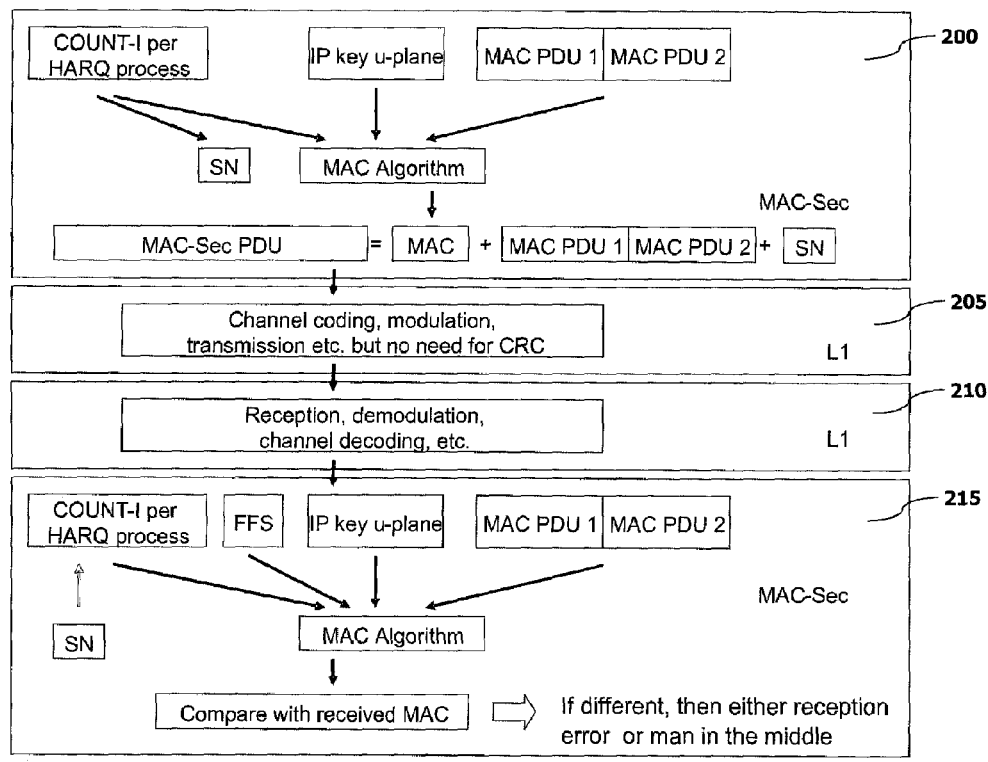
FIG. 8 is a block diagram depicting a method for performing integrity protection for U-plane data.

FIG. 8 is a block diagram depicting a method for performing integrity protection for U-plane data. It is known that integrity protection for U-plane data may result in significant overhead. Overhead problems often occur when small data blocks, such as those used for VoIP, are utilized. These scenarios are characterized by PDCP PDUs which are typically very small.

To reduce or otherwise minimize overhead caused by integrity protection, protection operations for U-plane data may be moved to the eNodeB/UE physical layer, and the cyclic redundancy check (CRC) may be replaced with a MAC. This arrangement prevents or minimizes potential threats on the air interface. An advantage of the technique of FIG. 8 is that during transmission on the physical air interface, there is no need to add another CRC code in order to check whether the data packet has been received correctly (e.g., without transmission errors).

The operations of FIG. 8 involve a transmitting entity and a receiving entity. In an embodiment, the transmitting entity is an eNodeB and the receiving entity is the UE. In this example, the operations of blocks 200 and 205 may be performed by the eNodeB, and the operations of blocks 210 and 215 may be performed by the UE. In an alternative embodiment, the transmitting entity is a UE, and the receiving entity is the eNodeB. In this example the operations of the UE and eNodeB are reversed such that the UE performs the operations of blocks 200 and 205, and the eNodeB performs the operations of blocks 210 and 215. By way of example only, further description of FIG. 8 refers to the example of transmission from the eNodeB to the UE.

At block 200, the MAC algorithm is shown receiving various parameters, such as COUNT-I, an integrity protection key, and an input message which may include U-plane data blocks (e.g., MAC PDU 1 and MAC PDU 2). The MAC algorithm may be configured to generate an integrity protected message, illustrated in the figure as MAC. These operations result in the forming of security protected data which includes the MAC (integrity protected), the input message, and optionally a sequence number. Recall that the counter value in both the transmitting and receiving side may be maintained by a sequence number (SN).

At block 205, the security protected data is processed for transmitting to the receiving entity (e.g., the UE). Typical processing which may occur includes channel coding, modulation, transmission, and the like. The security protected data is then transmitted by the eNodeB, which is subsequently received by the UE at block 210. The UE may process the received integrity protected data using conventional techniques (e.g., demodulating, channel decoding, and the like).

At block 215, and in a manner similar to that described in block 200, the MAC algorithm may be configured to generate the MAC. This second MAC value is then compared with the received first MAC (i.e., the MAC generated in block 200). If these MAC values differ, this would indicate that there is a reception error or that the data communicated between the eNodeB and the UE has otherwise been compromised in some manner (e.g., a man-in-the-middle attack). Moreover, if the first and second MAC values differ or otherwise do not correspond, a request for retransmission may be sent to the transmitting entity (e.g., the eNodeB). It is emphasized that that this request for retransmission does not require the use of the CRC.

Maintenance of the various counters (e.g. COUNT-C, COUNT-I) for URRC, U-plane, and LRRC, is desired in various situations. One technique for maintaining these counters is to add an explicit counter to every packet transmitted over the air. If a packet is later found to be missing the COUNT-C/COUNT-I values, synchronization is still possible as long as not more packets than half of the sequence number (SN) space are transmitted.

However, for the situation that the RLC (outer ARQ) is configured for lossless insequence transmission, it is not a requirement to add explicit sequence numbers that are used for the synchronization of COUNT-C/COUNT-I values between the transmitter and receiver. Instead it is typically sufficient to count the packets that are received, or that are indicated to be dropped (e.g., similar to that done in the move receiving window (MRW) procedure), thus reducing the overhead. The reduction in overhead is more prominent in situations in which only a few packets are dropped.

In UMTS, for example, the COUNT-C/COUNT-I values are initialized using either the START values or using a fixed value (e.g., 0) in the case that a new key is used. In LTE, it is often desirable to maintain the security context for as long as possible. Therefore a general example is one in which only new keys are used (at least for the control plane), which would reduce the need for transmitting START values for initializing the COUNT-C and COUNT-I values.

If key reuse is desired, it is sufficient to transmit the START values at the setup of the signaling connection. For a user plane bearer in UMTS, for example, the START value is often sent by the UE at radio bearer establishment. In this case, the START value would only require transmission when it is actually used.

In general, the type of context transfer that is expected may affect whether the COUNT-C/COUNT-I values (e.g. for the LRRC) are supposed to be maintained at the change of an eNodeB, or whether these values are to reinitialized upon the occurrence of this event. Both scenarios are possible and within the teachings of the present disclosure.

In GSM and UMTS, for example, the ciphering key (CK) and integrity key (IK) are typically generated by an authentication and key agreement (AKA) procedure. For instance, in UMTS, the AKA produces two different keys; one key for integrity protection, and a second key for ciphering. In an embodiment, such keys may be used for the ciphering and integrity protection of the URRC (RRC and NAS terminated in the AG).

Figure 9:
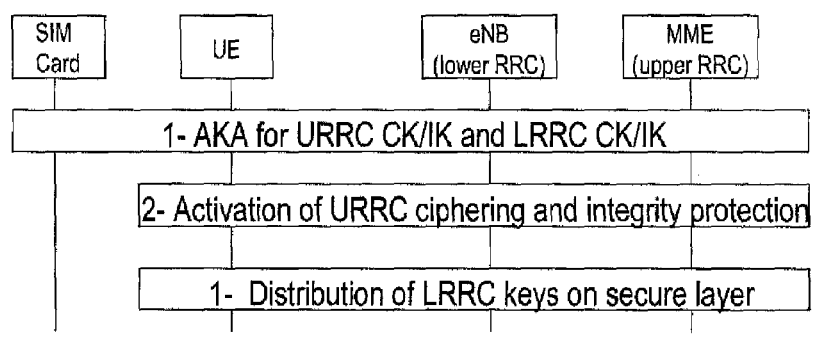
FIG. 9 depicts one approach for generating a desired second set of keys for the LRRC.

To achieve independent keys in the eNodeB for the LRRC and the AG for URRC/NAS, the need for a second set of keys may be required. FIG. 9 depicts one approach for generating a desired second set of keys for the LRRC. A first operation provides an AKA procedure for URRC CK and IK keys, and LRRC CK and IK keys. A second operation activates URRC ciphering and integrity protection. A third operation distributes the LRRC CK and IK keys on a secure layer. This example typically requires changes to the HLR, VLR, SIM card, which is not always a desirable action.

Figure 10:
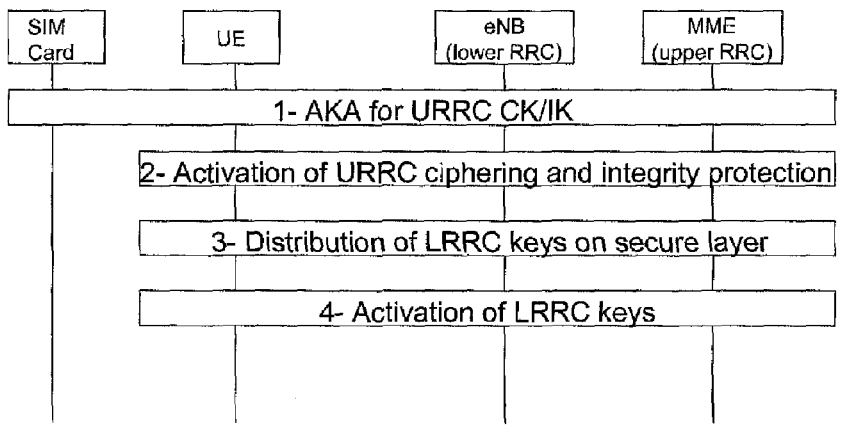
FIG. 10 depicts an approach for distributing the LRRC ciphering and/or integrity key.

Distributing the LRRC ciphering and/or integrity keys once the ciphered connection on the URRC/NAS is established is a technique which may be implemented to reduce the necessary impact that existing key generation techniques require during a typical AKA procedure. FIG. 10 depicts one such approach. In this figure, a first operation provides an AKA procedure for URRC CK and IK keys. A second operation activates URRC ciphering and integrity protection. A third operation distributes the LRRC CK and IK keys on a secure layer. A fourth operation activates the LRRC keys. The illustrated operations typically require ciphering which is systematically started in the AG. The illustrated procedure systematically requires two steps, which may slow down the session start procedure.

Figure 11:
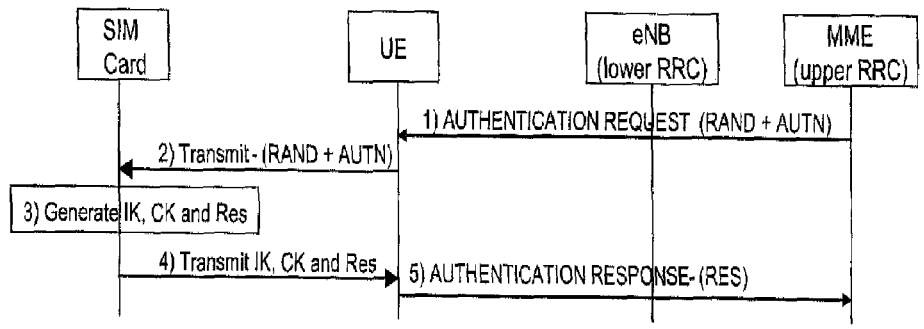
FIG. 11 depicts a typical AKA procedure using authentication parameters such as a random challenge (RAND) and an authentication token (AUTN)

FIG. 11 is an example of a typical AKA procedure using authentication parameters such as a random challenge (RAND) and an authentication token (AUTN). In particular, as a first operation, an authentication request having first authentication parameters RAND and AUTN is received by the UE.

In a second operation, the first authentication parameters are transferred to an authentication unit (e.g., SIM card). Algorithms associated with the SIM card may determine, for example, if the first authentication parameters verify that the AKA procedure has been initiated by an authorized entity.

In a third operation, the SIM card further generates a second set of parameters including an IK key, a CK key, and a second authentication parameter (e.g., response (RES) value). The second set of parameters is typically generated responsive to the first authentication parameters RAND and AUTN.

In a fourth operation, the second set of parameters is then transferred from the SIM card to the UE. In a fifth operation, the UE responsively generates an authentication response RES, which is sent to the AG so that the authenticity of the UE and/or SIM card may be verified, for example.

Figure 12:
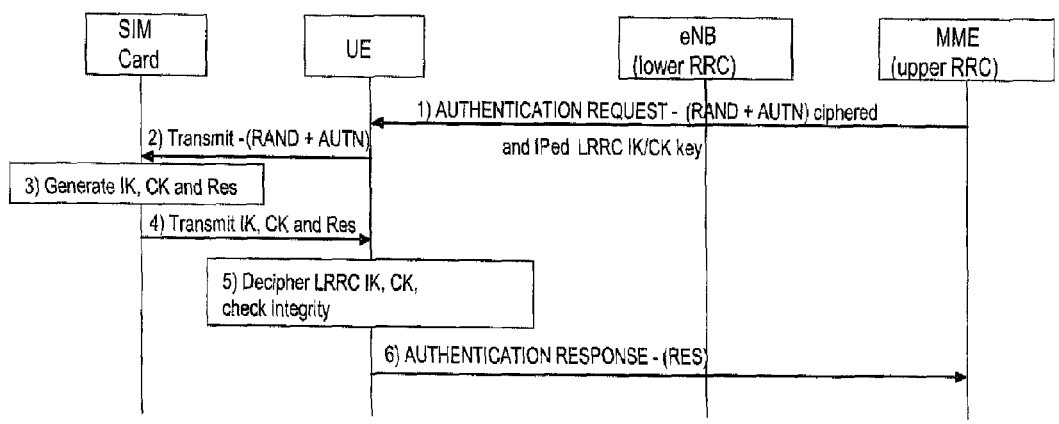
FIG. 12 depicts an AKA procedure using authentication parameters and at least one key value.

FIG. 12 is an example of an AKA procedure using authentication parameters and at least one key value. Although FIGS. 11 and 12 have several common aspects, the embodiment of FIG. 10 utilizes one or more key values at various stages of processing.

In a first operation, an authentication request having first authentication parameters RAND and AUTN is received by the UE. The authentication request may further include at least one key value (e.g., an LRRC IP/CK key) which is integrity protected and ciphered.

In a second operation, first authentication parameters RAND and AUTN are transferred to an authentication unit (e.g., SIM card). Algorithms associated with the SIM card may determine, for example, if the first authentication parameters verify that the AKA procedure has been initiated by an authorized entity.

In a third operation, the SIM card further generates a second set of parameters including an IK key, a CK key, and a second authentication parameter (e.g., response (RES) value). The second set of parameters is typically generated responsive to the first authentication parameters RAND and AUTN.

In a fourth operation, the second authentication parameter, IK key, and CK key, which were all generated based upon the first authentication parameters RAND and AUTN, are then transferred from the SIM card to the UE.

A fifth operation includes deciphering the at least one key value (e.g., an LRRC IP/CK key) based upon the IP key and the CK key. If desired, the fifth operation may additionally or alternatively verify the integrity of the least one key value.

In a sixth operation, the UE may responsively generate an authentication response RES, which is sent to the AG so that the authenticity of the UE and/or SIM card may be verified, for example.

One benefit of this procedure is that the LRRC keys, for example, may have already been transferred during the AKA procedure. Thus, when new URRC keys are generated, the LRRC keys may be made available simultaneously which would decrease the amount of time necessary for the transition from detached to idle/active state in LTE. The LRRC key sets may be generated in the eNodeB and transferred to the AG. Alternatively, the LRRC key sets may be chosen by the HLR, transferred to the AG, and then sent to the UE/eNodeB.

Figure 13:
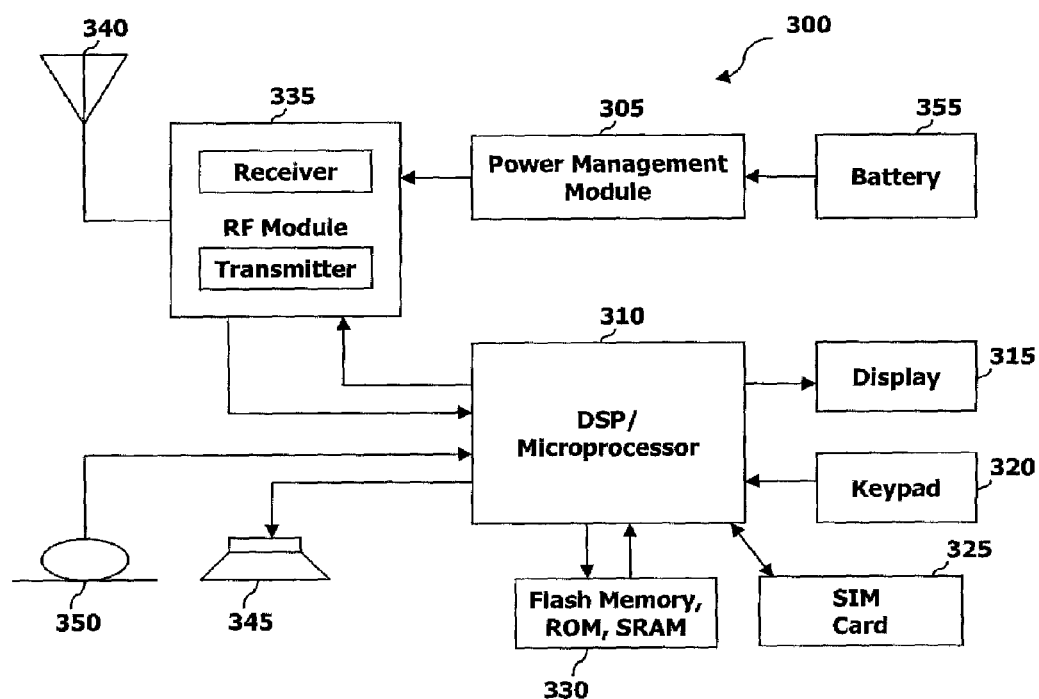
FIG. 13 is a block diagram of a mobile communication terminal.

FIG. 13 is a block diagram of mobile communication device 300, which may be configured as a UE in accordance with embodiments of the present invention. Device 300 is illustrated, for example, as a mobile phone and may be configured to perform various methods described herein. The mobile communication device 300 includes a processing unit 310 such as a microprocessor or digital signal processor, RF module 335, power management module 305, antenna 340, battery 355, display 315, keypad 320, optional subscriber identify module (SIM) card 325, memory unit 330 such as flash memory, ROM or SRAM, speaker 345 and microphone 350.

A user enters instructional information, such as a telephone number, for example, by pushing the buttons of keypad 320 or by voice activation using microphone 350. Processing unit 310 receives and processes the instructional information to perform the appropriate function, such as to dial the telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, for example, transmit radio signals comprising voice communication data. RF section 335 comprises a receiver and a transmitter to receive and transmit radio signals. Antenna 340 facilitates the transmission and reception of radio signals. Upon receiving radio signals, RF module 335 may forward and convert the signals to baseband frequency for processing by processing unit 310. The processed signals would be transformed into audible or readable information outputted via speaker 345, for example.

Processing unit 310 is adapted to perform various methods disclosed herein, among other operation. It will be apparent to one skilled in the art that mobile communication device 300 may be readily implemented using, for example, processing unit 310 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

The invention claimed is:

1. A method for providing message protection, the method comprising:
generating, by a transmitter, a ciphered message based upon at least one counter, a message, and a ciphering key;
generating, by the transmitter, an unciphered message authentication code (MAC) based upon the at least one counter, an integrity protection key, and the ciphered message; and
transmitting, by the transmitter, security protected data comprising the unciphered MAC and the ciphered message over a transmission medium,
wherein the generation of the ciphered message and the generation of the unciphered MAC occur independently, and
wherein the ciphering key and the integrity protection key are generated using authentication parameters including a random challenge and an authentication token.

2. The method according to claim 1, further comprising:
transmitting, by the transmitter, the at least one counter over the transmission medium.

3. The method according to claim 1, wherein the security protected data further comprises the at least one counter.

4. The method according to claim 1, wherein the transmission medium is unsecured.

5. The method according to claim 1,
wherein the generating of the ciphered message comprises using a ciphering algorithm.

6. The method according to claim 1,
wherein the generating of the unciphered MAC comprises using an integrity protection algorithm.

7. The method according to claim 1, further comprising:
incrementing, by the transmitter, the at least one counter at each transmission of the security protected data, wherein a receiving entity synchronizes a second counter based upon a detection of the transmission of the security protected data.

8. A transmitter operable in a communication network, the transmitter comprising:
a processor for providing message protection operations, wherein the processor is configured to:
generate a ciphered message based upon at least one counter, a message, and a ciphering key; and
generate an unciphered message authentication code (MAC) based upon the at least one counter, an integrity protection key, and the ciphered message; and
a transceiver configured to transmit security protected data comprising the ciphered MAC and the ciphered message over a transmission medium,
wherein the processor is further configured to generate the ciphered message and to generate the unciphered MAC independently, and
wherein the ciphering key and the integrity protection key are generated using authentication parameters including a random challenge and an authentication token.

9. The transmitter according to claim 8, wherein the transceiver is further configured to:
transmit the at least one counter over the transmission medium.

10. The transmitter according to claim 8, wherein the security protected data further comprises the at least one counter.

11. The transmitter according to claim 8, wherein the transmission medium is unsecured.

12. The transmitter according to claim 8, wherein the generating of the ciphered message comprises using a ciphering algorithm.

13. The transmitter according to claim 8, wherein the generating of the unciphered MAC comprises using an integrity protection algorithm.

14. The transmitter according to claim 8, wherein the processor is further configured to:
increment the at least one counter at each transmission of the security protected data, wherein a receiving entity synchronizes a second counter based upon a detection of the transmission of the security protected data.

* * * * *